United States Patent [19]

Gökcek

[11] Patent Number: 5,024,823
[45] Date of Patent: Jun. 18, 1991

[54] COPPER SULFATE ABSORPTION MASS TO REMOVE $ASH_3$, $PH_3$, $B_2H_6$, $GEH_4$ AND $SIH_4$

[75] Inventor: Cetin Gökcek, Muhlheim, Fed. Rep. of Germany

[73] Assignee: Messer Griesheim GmbH, Fed. Rep. of Germany

[21] Appl. No.: 279,851

[22] Filed: Dec. 5, 1988

[51] Int. Cl.$^5$ .......................... B01D 47/00; B01J 8/00; C01B 3/00
[52] U.S. Cl. ...................................... 423/210; 423/248
[58] Field of Search ................................ 423/248, 210

[56] References Cited

U.S. PATENT DOCUMENTS

| | | | |
|---|---|---|---|
| 4,431,562 | 2/1984 | Hiraki et al. | 423/248 |
| 4,532,115 | 7/1985 | Nishino et al. | 423/210 |
| 4,578,256 | 3/1986 | Nishino et al. | 423/248 |
| 4,593,148 | 6/1986 | Johnson et al. | 423/210 |
| 4,605,812 | 8/1986 | Nowack et al. | 423/210 |
| 4,671,803 | 6/1987 | Suggitt | 423/210 |
| 4,975,254 | 12/1990 | Suara et al. | 423/210 |

Primary Examiner—Gregory A. Heller
Attorney, Agent, or Firm—Connolly & Hutz

[57] ABSTRACT

An absorption mass consists of an oxidic porous carrier substance saturated with $CuSO_4$. The $CuSO_4$ is in the form of a monohydrate or with $CuSO_4$ free from water of crystallization.

10 Claims, No Drawings

COPPER SULFATE ABSORPTION MASS TO REMOVE $AsH_3$, $PH_3$, $B_2H_6$, $GeH_4$ AND $SiH_4$

BACKGROUND OF INVENTION

The invention relates to an absorption mass consisting of an oxidic porous carrier substance saturated with copper sulfate $CuSO_4$ which is suitable for the elimination of reactive process gases in the electronics industry.

The electronics industry makes use of reactive gases in the production of semi-conductors. Commonly used reactive gases are: arsenic hydride $AsH_3$, phosphorous hydride $PH_3$, boron hydride $B_2H_6$, germanium hydride $GeH_4$ and silicon hydride $SiH_4$. These reactive gases are toxic and tend to spontaneous combustion so that they must be effectively eliminated to prevent any negative effects on the environment.

An absorbent for the elimination, for example, of $AsH_3$ consists of a 60% solution of copper sulfate pentahydrate $CuSO_4 \cdot 5H_2O$ and silica gel whose residual moisture lies between 10% and 25%, following a drying period of 17 hours at a temperature of 110° C. A disadvantage of this known absorbent is its small absorption capacity and low threshold value. The threshold limit value (TLV value), in other words, the maximum admissable concentration of the substance can be used to establish the threshold value. Both factors mentioned above can easily lead to serious contamination of the environment even when the substance has been subsequently dump-covered as a precaution. An additional drawback is that the absorption front becomes totally blurred so that a visual detection of the degree of exhaustion of the absorption mass contained in a glass tube is more difficult.

SUMMARY OF INVENTION

The invention is, therefore, based on the object of providing an absorption mass having a substantially increased threshold value capacity. Threshold value capacity refers to the absorption capacity beyond which the threshold values (TLV values) are exceeded.

According to the invention, this increased threshold value capacity is achieved by means of an absorption mass consisting of an oxidic porous carrier substance which has been previously saturated with $CuSO_4$ in the form of a monohydrate or with $CuSO_4$ free from water of crystallization.

DETAILED DESCRIPTION

In accordance with the invention, the saturation is preferably carried out with $CuSO_4$ free from water of crystallization. Silica gel and aluminum oxide are particularly suitable as carrier substances.

The absorption masses according to the invention have a high reproducible threshold value capacity. In addition, they also constitute an absorption front which can be readily detected with the naked eye.

Such masses can also be readily used for high concentrations and as a result of their high threshold value capacity facilitate ultimate disposal.

The absorption masses according to the invention are produced by saturating the carrier substance with an aqueous solution of $CuSO_4 \cdot 5H_2O$, drying and dehydration at a temperature between 150° C. and 200° C. at atmospheric pressure.

Less favorable process results are obtained if the above mentioned temperatures are exceeded. At temperatures above 200° C., $CuSO_4$ can quickly break down to $CuO$ and $SO_2$. Dehydration can be quickly and reliably achieved at a temperature of 180° C. with inert gas flushing, a process which takes between one and two hours.

Saturation of the carrier substance with $CuSO_4$ can be carried out, for example, as follows:

A total of 1250 g of silica gel E (Manufacturers: BASF and Grace) having a granulate size of 6 mm is saturated with a solution of 1000 ml of hot distilled water and 641 g of $CuSO_4 \cdot 5H_2O$, subsequently evaporated in a drying chamber at a temperature of 110° C. and finally dehydrated at a temperature of 180° C. The absorbent can be best used when the pale-blue monohydrate or better still when the white $CuSO_4$ free from water of crystallization is present. The absorption mass thus produced is then removed from the drying chamber and immediately filled into glass tubes. Finally, it is stored, if possible, free from humidity.

The absorption mass is employed at room temperature.

The absorption masses according to the invention can be effectively employed to absorb not only arsenic hydride—with its extremely low threshold limit value of 0.01 ppm—but also all other reactive process gases commonly used in the electronics industry. The absorption front can be easily and distinctly detected in most of the investigated gases without indicator additive as a result of the indication of the gas per se. The following examples substantiate the advantages of the absorption masses saturated with $CuSO_4 \cdot 5H_2O$ according to the invention in comparison with the commonly used absorption masses. In all experiments, the absorption masses were produced as described above and filled into a glass tube measuring 440 mm in length and having an inside diameter of 24 mm. The dumping height was 370 mm which corresponds to a weight of 150 g and a volume of 167.3 cm$^3$. The gas flow rate was 50 l/hour. In each example, the first line refers to the data of a commonly used absorption mass and the second line to an absorption mass according to the invention.

Example 1
Elimination of arsenic hydride, $AsH_3$: (TLV value: 0.01 ppm)

| Mass | Treatment duration (h) | temp. (°C.) | Indication | TLV capacity (l/kg) |
| --- | --- | --- | --- | --- |
| $CuSO_4$/silica gel E | 17 | 110 | blurred grey | 3.7 |
| $CuSO_4$/silica gel E | 2 | 180 | black | 14.2 |

Example 2
Elimination of phosphorous hydride, $PH_3$: (TLV value: 0.01 ppm)

| Mass | Treatment duration (h) | temp. (°C.) | Indication | TLV capacity (l/kg) |
| --- | --- | --- | --- | --- |
| $CuSO_4$/silica gel E | 17 | 110 | blurred grey | 6.3 |
| $CuSO_4$/silica gel E | 2 | 180 | black | 25.2 |

Example 3
Elimination of diboran, $B_2H_6$: MA (TLV value 10 ppm)

| Mass | Treatment duration (h) | temp. (°C.) | Indication | TLV capacity (l/kg) |
| --- | --- | --- | --- | --- |
| $CuSO_4$/silica gel E | 17 | 110 | none | 1.0 |
| $CuSO_4$/silica gel E | 2 | 180 | black | 19.5 |

Example 4
Elimination of monosilan, $SiH_4$: (TLV value 10 ppm)

| Mass | Treatment duration (h) | temp. (°C.) | capacity Indication | TLV (l/kg) |
| --- | --- | --- | --- | --- |
| $CuSO_4$/silica gel E | 17 | 110 | none | immediate escape |
| $CuSO_4$/silica gel E | 2 | 180 | black | 24.5 |

These examples show a substantial increase in the threshold limit value capacities of the absorption masses according to the invention in comparison to the commonly used absorption masses. In addition to the cited reactive gases, dicyanogen, amine, ammonia, $H_2S$ and $NO_2$ can also be eliminated with the absorption masses according to the invention but also of course mixtures of any of the cited gases. After absorption of $S_2$, the absorption masses according to the invention but also of course mixtures of any of the cited gases. After absorption of $S_2$, the absorption mass can be regenerated at a temperature of 80° C.

SUMMARY

Reactive process gases used in the electronics industry, in particular, $AsH_3$, $PH_3$, $B_2H_6$, $GeH_4$ and $SiH_4$ can be eliminated by means of an absorption mass consisting of a porous oxidic carrier substance, for example, silica gel saturated with $CuSO_4$ pentahydrate. In order to improve the absorption effect, the $CuSO_4$ pentahydrate is dehydrated at a temperature between 150° C. and 200° C. to obtain $CuSO_4$ monohydrate or $CuSO_4$ free from water of crystallization.

What is claimed is:

1. A process to eliminate gases selected from the group consisting of $AsH_3$, $PH_3$, $B_2H_6$, $GeH_4$ and $SiH_4$ including the steps of forming an absorption mass by saturating a porous carrier in the form of silica gel or aluminum oxide with $CuSO_4$ in the form of monohydrate or $CuSO_4$ free from water of crystallization, contacting the gases with the absorption mass, and absorbing the gases in the absorption mass.

2. The process of claim 1 wherein the forming step includes saturating the carrier with $CuSO_4.5H_2O$, subsequently drying the saturated carrier and then dehydrating the dried carrier at a temperature between 150° and 200° C.

3. The process of claim 2 wherein the dehydrating step is carried out at a temperature between 175° and 185° C. for a time period of from one to two hours.

4. The process of claim 1 wherein the reactive gases are used in the production of semi-conductors in the electronics industry.

5. The process of claim 1 wherein the $CuSO_4$ is in the form of a monohydrate.

6. The process of claim 1 wherein the $CuSO_4$ is in the form of $CuSO_4$ free from water of crystallization.

7. The process of claim 1 wherein the carrier substance is a silica gel.

8. The process of claim 7 wherein the elimination of the gases is visually detected.

9. The process of claim 8 wherein the visual detection is by observing the mass becoming darker.

10. The process of claim 1 wherein the mass is formed by drying at an elevated temperature and then dehydrated at a temperature higher than the drying temperature.

* * * * *